Jan. 8, 1952   J. D. DONNA   2,581,522
STOKER CONTROL APPARATUS
Filed May 24, 1948
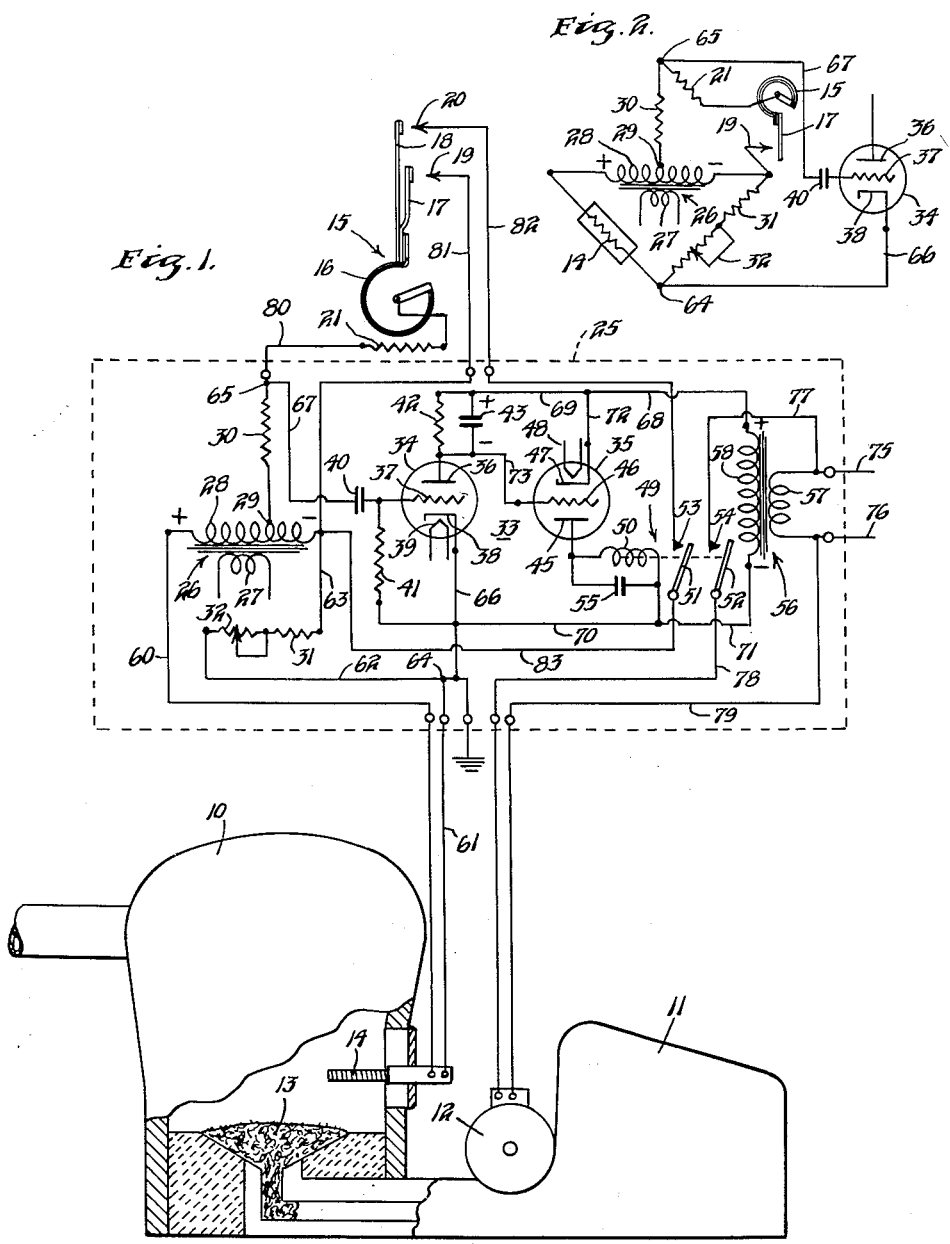
Inventor
JOSEPH D. DONNA
By
George H. Fisher
Attorney Patented Jan. 8, 1952

2,581,522

UNITED STATES PATENT OFFICE 2,581,522

STOKER CONTROL APPARATUS

Joseph D. Donna, Minneapolis, Minn., assignor to Minneapolis-Honeywell Regulator Company, Minneapolis, Minn., a corporation of Delaware Application May 24, 1948, Serial No. 28,912

8 Claims. (Cl. 236—9)

The present invention is concerned with a stoker control apparatus and more particularly with that type of stoker control apparatus employing a temperature sensing resistor located in the vicinity of the fire in the furnace.

The present invention proposes using a temperature sensing resistance element in an electrical network whose output voltage will be varied as the temperature of the fire in a stoker fired furnace changes. The output voltage gives an indication of the need for operation of the furnace. Upon a call for heat in the area being heated, a room thermostat closes and connects its anticipating heater into the network to vary the output voltage of the network by a fixed amount to initiate and maintain operation of fuel feeding means until the furnace temperature reaches a predetermined value or the room thermostat no longer indicates a need for operation of the fuel feeding device.

It is therefore an object of the present invention to provide an improved stoker controlling apparatus of the type in which the stoker is not only controlled by an element responsive to the temperature of the space being heated but is also controlled by an element responsive to a temperature condition directly effected by combustion.

A further object of the present invention is to provide an improved stoker controlling apparatus which utilizes an electrical network whose electrical output is varied not only by the temperature of the fire in the furnace but by a thermostatic switching device which has an anticipating heater which when added to the resistance of the network will unbalance the network by an amount proportional to the resistance of the anticipating heater.

A still further object of the present invention is to provide an improved stoker controlling apparatus using an electrical network whose balance point is an indication of the need for operation of fuel feeding means and providing therewith a thermostatic device having an anticipating heater which is operable to shift the balance point of the network by a predetermined amount upon a need for operation of the fuel feeding means as indicated by the thermostatic device.

Other objects of the present invention will be apparent from a consideration of the accompanying specification, claims and drawing, of which:

Figure 1 is a schematic view of one form of a stoker control apparatus employing my improved stoker controlling apparatus; and Figure 2 shows the control network of the invention separated from the entire apparatus.

Referring first to Figure 1, the numeral 10 represents a furnace 10 which is adapted to heat the area whose temperature is being controlled. A stoker 11 is provided to supply fuel to the furnace and has included thereon a stoker motor 12 which is operable when energized to supply fuel and air to a fire box section 13. Detecting the presence of combustion in the furnace 10 is a temperature sensitive resistance element 14.

The numeral 15 represents a thermostatic device which is adapted to give an indication of the need for operation of the furnace when the temperature of the space or room being heated drops below a predetermined value. The thermostat 15 consists of a bimetal 16 which is adapted to move a pair of switch blades 17 and 18 into and out of engagement with their associated contacts 19 and 20 respectively upon changes in room temperature above or below the desired temperature. An anticipating heater 21 is provided to heat the bimetal 16 in order to anticipate the time that will be necessary to shut down the burner in order to prevent the room temperature from carrying beyond the desired value.

Located within a general housing 25 are the main control circuits of the subject apparatus. Included within the housing 25 is a transformer 26 which supplies energy to a balanced electrical network of my control apparatus. This transformer consists of a primary 27 which is connected to a suitable source of power and a secondary winding 28 which is tapped at 29. Directly associated with the balanced electrical network and forming a part thereof are fixed resistors 30 and 31 and a calibration potentiometer 32.

Detecting of the balance of the electrical network is done by an amplifier of the electronic type which is indicated generally at 33. The amplifier 33 consists of a pair of electron discharge devices 34 and 35 which may be of the triode type. The triode 34 may be seen to consist of an anode 36, a control electrode 37, and a cathode 38 which is heated to be electron emissive by filament heater 39. The input circuit to this triode consists of a coupling condenser 40 and a grid resistor 41. The output of triode 34 consists of a parallel connected resistor 42 and condenser 43. The triode 35 may be seen to consist of an anode 45, a control electrode 46, and a cathode 47 which is heated to be electron emissive by a filament heater 48 energized by any suitable means not shown as an additional power transformer secondary. A relay 49 is connected in the output circuit of the triode 35 and may be seen to consist of a relay winding 50, and a pair of switch blades 51 and 52 which are normally biased out of engagement with associated contacts 53 and 54. A condenser 55 is provided to function in the normal manner by-passing the alternating component of the current flowing in the output circuit of triode 35. A transformer 56 is provided to supply power to the amplifier 33 and this transformer may be seen to consist of a primary winding 57 which may be connected to any suitable source of power and a secondary winding 58.

As Figure 2 is the control network of Figure 1 redrawn, like components carry like reference numerals.

Operation

Considering the operation of the apparatus, it will be assumed that initially there is an adequate fire in the furnace and that the room thermostat 15 and the control relay 49 are in the deenergized position as shown on the drawing. Under these assumed conditions, the stoker 11 will be inoperative and not feeding fuel to the furnace 10. The temperature sensing resistance element 14 will be sensing the temperature of the fire in the furnace and its resistance will be such as to indicate no need for operation of the stoker.

The temperature sensing resistance element 14 is actually part of an electrical network that may be traced from the left hand terminal of the secondary 28 through conductor 60, element 14, conductors 61 and 62, calibration potentiometer 32, resistor 31, and conductor 63 to the right hand terminal of the secondary 28. The output terminals of this electrical network are indicated at 64 and 65. The output terminal 64 is actually the junction between the calibration potentiometer 32 and the resistance element 14 while the output terminal 65 is located at the upper end of resistance 30 whose lower end is connected to the tap 29 of the secondary 28. The terminal 64 is connected to the cathode 38 of the triode 34 by means of a conductor 66 and the output terminal 65 is connected to the control electrode 37 of triode 34 through a conductor 67 and the coupling condenser 40. When the apparatus is in the condition assumed the temperature sensing resistance element 14 will be of such a value of resistance that there will be an output voltage on the terminals 64 and 65 which will bias the triode 34 to be conducting.

Reference to Figure 2 shows better the association of the elements of the control network. Under the assumed conditions, the resistance of the temperature sensing resistor 14 is sufficient to counterbalance the fixed resistance of the resistor 31 and potentiometer 32. With tap 29 displaced from the center of the secondary 28, the alternating current phasing of the tap 29 will be the same as the right hand end of secondary 28 and the phasing of terminal 64 will be that of the left hand terminal of secodnary 28. The magnitude of the voltage will be the amount of displacement of the tap 29 from the center of the secondary 28, assuming a balanced condition in the lower half of the control network. The resistor 30 will have no appreciable affect on the voltage at output terminal 65 for there is a relatively high impedance input circuit on the input to triode 34 when compared with the resistance of resistor 30.

Since the signal from the electrical network is alternating current and the power supply for the amplifier 33 is alternating current it will be obvious that the phase of the voltage on the network output terminals under these conditions will have to be such that the control electrode 37 of triode 34 will be biased in the conducting range when the anode 36 is on the positive half cycle of the power supply voltage. With the triode 34 conducting there will be a current flow in the anode circuit of this triode that may be traced from the upper terminal of the secondary 58 through conductors 68 and 69, resistor 42, anode 36, cathode 38, conductor 66, conductors 70 and 71 back to the lower terminal of the secondary 58. With this current flow as traced a voltage will be built up on the condenser 43 such that its upper terminal is positive and its lower terminal is negative. This voltage on the condenser 43 is used to bias the triode 35 to be non-conducting and this may be seen since the upper terminal of the condenser 43, which is positive, is connected to the cathode 47 by conductors 69 and 72 while the lower terminal of the condenser 43 which is negative is connected to the control electrod 46 of triode 35 by conductor 73. This biasing voltage will maintain the triode 35 non-conducting so that it will be impossible for the relay 49 to become energized.

Assume now that the temperature in the furnace 10 begins to drop so that there is a danger of the fire going out unless additional fuel is added to the fire box 13. This temperature drop will be sensed by the element 14 which as explained below, will shift the output voltage of the above described electrical network to a point where the triode 34 will be biased to be non-conducting. With the temperature sensing element 14 having a positive temperature coefficient of resistance, a temperature drop in the furnace will cause the resistance of the element 14 to decrease and therefore the output voltage when measured from the terminal 65 to the terminal 64 will become more negative with a drop in temperature in the furnace, assuming that the secondary 28 is phased so that the left hand terminal is positive with respect to the right hand terminal. Referring again to Figure 2, the drop in temperature of the resistor 14 will effectively move the phasing of terminal 64 toward that of the left hand terminal of the secondary 28. This will mean, with the phasing as above, the terminal 64 will become more positive.

With the amplifier power supply, as shown in Figure 1, phased so that the upper terminal of the secondary 58 is positive with respect to the lower terminal, it may be seen that when the anode 36 of the triode 34 is positive or on its conducting portion of the half cycle the control electrode 37 will be considerably negative and therefore the triode 34 will not pass current. When there is no current flow through the anode circuit of the triode 34 there will be no biasing voltage built up across the condenser 43 so that under these conditions the triode 35 will have no biasing voltage on its input to maintain it non-conducting. The control electrode 46 is effectively connected to the cathode 47 by means of conductors 73, resistor 42, and conductors 69 and 72. The triode 35 will now be conducting and its conducting circuit may be traced from the lower terminal of the secondary 58 through the conductor 71, relay winding 50, anode 45, cathode 47, conductors 72 and 68 back to the upper terminal of the secondary 58. With current flowing through the relay winding 50 the switch blades 51 and 52 will be moved into engagement with their switch contacts 53 and 54.

When switch blade 52 engages switch contact 54 and electrical circuit is completed to the stoker motor 12 and this circuit may be traced from the input power line 75 through conductor 77, switch contact 54, switch blade 52, conductor 78, stoker motor 12, and conductor 79 back to the other input power line 76. With the stoker motor energized additional fuel and air will be supplied to the fire box 13 of furnace 10 until such time as the temperature within the fire box rises to a predetermined value. As the temperature in the furnace rises the temperature sensing resistance element 14 will increase its resistance sufficiently so that the output voltage between the terminals 65 and 64 will be less negative and sufficiently so that the triode 34 will once again become conducting. With triode 34 conducting the triode 35 will be biased to be non-conducting and the relay 49 will become deenergized to discontinue the operation of the stoker motor 12.

The operation as discussed so far has been concerned solely with the fire maintaining operation of the subject control apparatus. This fire maintaining operation is necessary to see that a fire is maintained within the fire box 13 regardless of whether the room thermostat is indicating a need for heat or not. Naturally the apparatus may be calibrated by potentiometer 32 so that the fire maintaining temperature of the furnace does not appreciably affect the room temperature wherein is located the thermostat 15 even on days when the outside temperature is mild.

Assume next that the temperature of the space whose temperature is being controlled drops. This drop will be sensed by the temperature sensing device 15 and the bimetal 16 will move the switch blades 17 and 18 into engagement with their associated switch contacts 19 and 20. When the switch blade 17 engages switch contact 19 the voltage on the output terminals 65 and 64 is shifted to a new value and in such a direction as to cause the output voltage to be more negative when the transformer secondary 28 is phased as indicated above. This shift in voltage may be understood when an electrical circuit is traced from the tap 29 of the secondary 28 through resistor 30, output terminal 65, conductor 80, anticipating resistor 21, bimetal 16, switch blade 17, switch contact 19, and conductor 81 back to the right hand terminal of the secondary 28. Referring to Figure 2, the engaging of switch contact 19 with switch blade 17 effectively connects the resistor 30 and the anticipating heater 21 as a voltage divider across the secondary 28 between the taps 29 and the right hand terminal of the secondary. This in effect shifts the output terminal 65 from a voltage represented by the tap 29 to an imaginary point between tap 29 and the right hand terminal of the secondary. The amount of voltage shift will depend upon the ratio between the resistances of the resistor 30 and the anticipating heater 21. It will be noted that if the anticipating heater 21 were eliminated the voltage on the terminal 65 would be that of the right hand terminal of secondary 28 because it would be directly connected thereto by thermostat 15.

Referring again to Figure 1, since this shift is such as to make the output voltage between the terminals 65 and 64 more negative the triode 34 will be biased to be non-conducting and therefore the triode 35 will be conducting and the relay 49 will become energized. When the relay 49 becomes energized switch blades 51 and 52 move into engagement with their respective contacts 53 and 54. With switch blade 52 engaging switch contact 54, the energizing circuit to the stoker motor 12 will again be completed and additional fuel and air will be supplied to the fire box 13. When the switch blade 51 engages switch contact 53 a holding circuit is established for the room thermostat switching circuit and this may be traced from the tap 29 of the secondary 28 through resistor 30, output terminal 65, conductor 80, anticipating heater 21, bimetal 16, switch blade 18, switch contact 20, conductor 82, switch contact 53, switch blade 51, and conductor 83 back to the right hand terminal of the secondary 28. It will be noted that this circuit is independent of switch contact 20. The reason for providing this circuit will be understood when it is noted that the switch blade 18 actually engages switch contact 20 before switch blade 17 engages switch contact 19. This sequential switching is provided to prevent chattering of the thermostatic contacts and the control relay under certain conditions. When the room temperature drops, blade 18 will engage contact 20 and as soon as blade 17 engages contact 19 the relay 49 will be energized and the switch blade 51 in engaging contact 53 will make a positive circuit as traced above which will not be interrupted until the temperature rises sufficiently to cause disengagement of switch blade 18 from contact 20. The relay hence will not be subject to any chattering tendencies which might occur if a single contact thermostat were used.

When the burner is brought into operation by the closing of the room thermostat, fuel and air will be added to the fire box 13 and the temperature of the furnace will rise to heat the area in which the room thermostat is located. As soon as the room thermostat has been heated sufficiently the blades 17 and 18 will be moved out of engagement with their respective contacts 19 and 20 and when these contacts disengage relay 49 will become deenergized and the balance of the electrical network will be shifted from the heat demand operating position back to the fire maintaining operating position. That is, the effective connection of the output terminal 65 is moved from the imaginary tap on the secondary 28 back to the secondary tap 29. The heat that effects the room thermostat 15 in shutting down the stoker motor originates not only from the furnace in supplying heat to the area where the thermostat is located but also from the anticipating heater 21. Inasmuch as there is a time lag between the time the heat is generated in the furnace till the time it is made effective in the room the heat anticipating resistor effectively anticipates the amount of heat that must be generated in the furnace so that while the temperature of the room at the time the thermostat opens is not of itself sufficient to open the thermostat the room temperature will rise to the desired value when the stored heat in the furnace and heating system reaches the room.

If the heat demand conditions are unusually heavy it may be necessary for a "high limit" function to take place to prevent the over heating of the furnace and the heating system. Assume, for example, that the room thermostat 15 has been operative calling for more heat for a long period of time. It will be recalled that when the room thermostat is operative the output voltage of the control network was shifted by an amount proportional to the relative resistances of the resistor 30 and the anticipating heater 21 and this voltage was in a negative direction. Now, with the continued operation of the furnace stoker motor 12, the temperature within the furnace will be rising considerably and this temperature rise will be sensed by the element 14 whose resistance will be increasing with the increases in temperature in the furnace. If the temperature of the furnace increases sufficiently the resistance of the element 14 will have increased sufficiently to overcome the negative voltage added into the control network upon the operation of the room thermostat. When this negative voltage from the room thermostat has been overcome by the increased resistance of the element 14 the output voltage between the output terminals 65 and 64 will be of such a value that the triode 34 will become conductive. With triode 34 conducting the triode 35 will be biased to be non-conducting and therefore the relay 49 will become de-energized to discontinue operation of the stoker motor 12 until such time as the temperature within the fire box 13 has dropped below the value that it is necessary to limit. Obviously, the opening of the room thermostat indicating there is no need for further operation of the stoker motor will also result in the discontinuing the operation of the stoker motor.

From the foregoing it can be seen that an improved stoker control apparatus has been provided for maintaining a hold fire condition in the stoker fired furnace, which will actuate the stoker upon a need for heat in the space whose temperature is being controlled, and prevent operation of the stoker when the temperature of the furnace has exceeded a predetermined maximum temperature. It may be further seen that the present apparatus has provided a simplified control apparatus utilizing a room thermostat and its anticipating heater in controlling the electrical network of the subject apparatus by having the anticipating heater function not only as a heat anticipator but as a voltage shifter in the control network. In general, while I have shown a specific embodiment of my invention, it is to be understood that it is for purposes of illustration only and that my invention is to be limited only by the scope of the appended claims.

I claim as my invention:

1. In a control for a stoker fired furnace; an electrical network having two output terminals, said network comprising a source of power, first and second resistors, a thermostatic switching device having switch contacts and an anticipating heater, a temperature responsive resistor adapted to be positioned in heat exchange relation to the fire in the furnace, means connecting said first resistor and said temperature responsive resistor in series to said source of power with the junction of said resistors forming one of said output terminals, means connecting said second resistor and said thermostatic device in series to said source of power with the junction of said resistor and said device forming the other output terminal of said network, and having a first signal voltage on said output terminals when the temperature of the furnace drops below a predetermined value, and a second signal voltage on said output terminals when the temperature of the furnace rises; network unbalance signal voltage detecting means operable when energized to energize a control circuit and to thereby initiate the operation of the stoker fired furnace; when connected thereto; electrical circuit means connecting said detecting means to said output terminals in such a manner that said detecting means is energized when said first signal voltage appears on said terminals and deenergized when said second signal voltage appears upon the temperature of the furnace rising; and means including the switch contacts of said thermostatic switching device with said anticipating heater when operative for changing by a predetermined amount the temperature at which said temperature responsive resistor will be effective to cause said first and second signal voltages to appear on said output terminals.

2. In a control for a stoker fired furnace; an electrical network having two output terminals, said network comprising a source of power, first and second resistors, a thermostatic switching device having switch contacts and an anticipating heater, a temperature responsive resistor adapted to be positioned in heat exchange relationship to the fire of the furnace, means connecting said temperature responsive resistor and said first resistor to said source of power with the junction of said resistors forming one of said output terminals, means connecting said second resistor to a first point on said source of power with the end of said resistor opposite that connected to said source of power forming the other output terminal of said network, means connecting the switch contacts of said thermostatic switching device and said anticipating heater in series between said other output terminal and a second point on said source of power so that when said thermostatic switch is actuated said second resistor and said anticipating heater form a voltage divider across said first and second points of said source, said network having a first signal voltage on said output terminals when the temperature of the furnace drops below a predetermined value, and a second signal voltage on said output terminals when the temeprature of the furnace rises; network unbalance signal voltage detecting means operable when energized to energize a control circuit and to thereby initiate operation of the stoker fired furnace; and circuit means connecting said detecting means to said output terminals in such a manner that said detecting means is energized when said first signal voltage appears on said terminals and deenergized when said second voltage appears upon the temperature of the furnace rising; and means including the switch contacts of said thermostatic switching device and said anticipating heater for changing the temperature at which said temperature responsive resistor will be effective to cause said first and second signal voltages to appear on said output terminals.

3. In a control for a stoker fired furnace; a first electrical network having output terminals, said first network comprising, a first resistor, a temperature responsive resistor located in heat exchange relationship to the fire of the furnace, a source of power, means connecting said resistors in series to said source of power with the junction of said resistors forming one of said output terminals, and having a first voltage on said output terminals when the temperature of the fire drops below a predetermined value and a second voltage when the temperature of the fire increases above a predetermined value; a second electrical network including a second resistor and a thermostatic switching device having switch contacts and an anticipating heater; means connecting said second resistor and the switch contacts of said device in series to said source of power to comprise with said first electrical network, a complex electrical circuit having as circuit output terminals said named output terminal of said first electrical network and the junction of said thermostatic device and said second resistor, said complex circuit having said first or second signal voltages on said circuit output terminals when said thermostatic device is not operative and the temperature of the furnace varies over a first range of values and having said first or second signal voltages on said output terminals when the temperature of the furnace varies over a second range of values when said device is operative; network unbalance signal voltage detecting means operable when energized to energize a control circuit to thereby initiate operation of the stoker fired furnace; and electrical means connecting said detecting means to said circuit output terminals in such a manner that said detecting means is energized when said first signal voltage appears on said terminals and deenergized when said second signal voltage appears upon the temperature of the furnace rising.

4. In combination, an electric transformer secondary winding having two end terminals and a tap therebetween, a first resistor connected at one end to said tap, a second resistor, means connecting one end of said second resistor to one of said end terminals, a pair of electrical circuit connecting means located on said other end terminal and the other end of said second resistor and adapted to be connected to a variable condition responsive impedance, means including said secondary winding and said resistors, when connected with the variable impedance, forming an electrical network having output terminals at the other end of said first resistor and at said connecting means on said second resistor, electrical signal detecting means connected to said output terminals and adapted to control operation of condition changing means in accordance with the signal voltage on said output terminals, and a second pair of electrical circuit connecting means one of which is common to one of said output terminals and the other of which is common to one of said end terminals, said pair adapted to be connected to condition responsive switching means having switch contacts and when so connected causing the voltage on said output terminals to be varied upon operation of the switching means.

5. In a control for a stoker fired furnace; a first electrical network having output terminals, said first network comprising, a first resistor, a temperature responsive resistor adapted to be positioned in heat exchange relationship to the fire of the furnace, a source of power, means connecting said resistors in series to said source of power with the junction of said resistors forming one of said output terminals, said first network having a first voltage on said output terminals when the temperature of the fire drops below a predetermined value and a second voltage when the temperature of the fire increases above a predetermined value; a second electrical network including a second resistor and a thermostatic switching device having switch contacts and an anticipating heater; means connecting said second resistor and the contacts of said device in series to said source of power to comprise with said first electrical network a complex electrical circuit having as circuit output terminals said named output terminal of said first electrical network and the junction of said thermostatic device and said second resistor as a further circuit output terminal; means including electron discharge means operable when biased into a first range of conductivity to initiate the operation of the stoker fired furnace and when biased into a second range of conductivity to interrupt operation of the furnace; electrical circuit means connecting said discharge means to said circuit output terminals in such a manner that said discharge means is biased into said first range when said first voltage appears on said terminals and biased into said second range when said second voltage appears upon the temperature of the furnace rising to maintain the temperature of the furnace in a first range of values when the thermostatic switching device is not operated; and means including the contacts of said switching device and said anticipating heater when operated for maintaining the temperature affecting said temperature responsive resistor in a second range of values as said discharge means is biased into or out of said first or second ranges of conductivity by changes of temperature of said responsive resistor.

6. In combination; a balanceable electrical network having output terminals, said network comprising a source of power and a first impedance adapted to be varied by a change of a first condition; means including said impedance for varying the signal voltage on said output terminals; a second impedance connected to one of said output terminals, a third impedance, automatically operative switch means having contacts adapted when actuated upon the occurrence of a second condition to connect said second and said third impedances in series as a voltage divider in said network to affect the signal voltage on said output terminals, and network unbalance signal detecting means electrically connected to said output terminals and responding to the signal voltage thereon to effect control of the conditions affecting said first impedance and said switch means.

7. In combination, an electric transformer secondary winding having two end terminals and a tap therebetween, a first resistor connected at one end to said tap, a second resistor, means connecting one end of said second resistor to one of said end terminals, a pair of electrical connecting means one of which is positioned on said other end terminal and the other of which is positioned at the other end of said second resistor and adapted to be connected to a variable condition responsive impedance, means including said secondary winding and said resistors when connected with the variable impedance forming an electrical network having output terminals at the other end of said first resistor and at said connecting means on said second resistor, electrical signal detecting means connected to said output terminals and adapted to control operation of condition changing means in accordance with the signal voltage on said output terminals, and a second pair of electrical connecting means one of which is common to one of said output terminals and the other of which is common to one of said end terminals, said pair adapted to be connected to a condition responsive switching means having switch contacts and an impedance in series therewith and when so connected causing the voltage on said output terminals to be varied upon operation of the switching means.

8. In a control for a stoker fired furnace, an electrical network having output terminals, said network comprising a source of power, first and second resistors, a thermostatic device having switch contacts and an anticipating heater, a temperature sensitive resistor adapted to be positioned in heat exchange relation to the fire in said furnace, means connecting said temperature sensitive resistor and said first resistor in series to said source, means connecting said second resistor to a point on said source, said output terminals of said network including a point in the series connection of said temperature sensitive resistor and said first resistor and a point on said second resistor other than the point of connection to said source, said resistors when so connected causing the output voltage on said output signal terminals to be of a first value when the temperature of the furnace drops below a predetermined value and of a second value when the temperature of the furnace rises, network unbalance signal detecting means operable when energized to initiate the operation of said stoker fired furnace; electrical circuit means connecting said detecting means to the output terminals of said network so that said detecting means is energized when said first signal voltage appears on said output terminals and deenergized when said second signal voltage appears on said output terminals upon the temperature of the furnace rising; and means connecting the contacts of said thermostatic device and said anticipating heater in series between a point on said second resistor and said source of power so that when said device is operative the temperature at which said temperature sensing resistor is effective to cause said first and second signal voltages on said network output terminal has been increased by a predetermined amount.

JOSEPH D. DONNA.

REFERENCES CITED

The following references are of record in the file of this patent:

UNITED STATES PATENTS

| Number | Name | Date |
| --- | --- | --- |
| 2,236,624 | Littwin | Apr. 1, 1941 |
| 2,366,500 | Eastin | Jan. 2, 1945 |
| 2,482,739 | Wilson | Sept. 20, 1949 |